(12) United States Patent
Lee et al.

(10) Patent No.: US 7,924,522 B2
(45) Date of Patent: Apr. 12, 2011

(54) APPARATUS AND METHOD OF DETECTING ERROR SYMBOL, AND DISK DRIVE APPARATUS USING THE SAME

(75) Inventors: Joo-hyun Lee, Suwon-si (KR); Jong-yun Yun, Suwon-si (KR); Jae-jin Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 863 days.

(21) Appl. No.: 11/751,843

(22) Filed: May 22, 2007

(65) Prior Publication Data
US 2007/0274419 A1 Nov. 29, 2007

(30) Foreign Application Priority Data

May 26, 2006 (KR) ........................ 10-2006-0047527

(51) Int. Cl.
*G11B 5/09* (2006.01)
(52) U.S. Cl. .............................. 360/53; 360/39; 375/343
(58) Field of Classification Search ......................... None
See application file for complete search history.

(56) References Cited

FOREIGN PATENT DOCUMENTS

| JP | 11-168514 | 6/1999 |
|---|---|---|
| JP | 2000-243034 | 9/2000 |
| JP | 2004-310854 | 4/2004 |
| KR | 1999-61966 | 7/1999 |

OTHER PUBLICATIONS

Roy D. Cideciyan, Jonathan D. Coker, Evangelos Eleftheriou, and Richard L. Galbraith, "Noise Predictive Maximum Likelihood Detection Combined with Parity-Based Post-Processing", IEEE Transactions on Magnetics, vol. 37, No. 2, Mar. 2001.

*Primary Examiner* — Jason C Olson
(74) *Attorney, Agent, or Firm* — Stanzione & Kim, LLP

(57) ABSTRACT

An apparatus and a method of detecting an error symbol in a data storage apparatus so that an error correcting performance of an error correction decoder. The error symbol detecting apparatus includes an equalizer equalizing a signal transmitted to a channel using a channel equalization characteristic that is suitable for a corresponding system, a data detector to detect data from the signal output from the equalizer, a modeling tool designed to have the same characteristics corresponding to a partial response (PR) target polynomial applied to the system, a correlation evaluation information generating unit to generate correlation evaluation information based on a correlation degree between an actual output of the equalizer and a target output of the modeling tool, and an error symbol determination unit to determine an order of probability of error generation of the symbols based on the correlation evaluation information, and to determine a predetermined number of symbols having a high probability of generating errors corresponding to the order of probability of error generation as error generating symbols.

18 Claims, 3 Drawing Sheets

APPARATUS AND METHOD OF DETECTING ERROR SYMBOL, AND DISK DRIVE APPARATUS USING THE SAME

CROSS-REFERENCE TO RELATED APPLICATIONS

This application claims priority under 35 U.S.C. §119(a) from Korean Patent Application No. 10-2006-0047527, filed on May 26, 2006, in the Korean Intellectual Property Office, the disclosure of which is incorporated herein in its entirety by reference.

BACKGROUND OF THE INVENTION

1. Field of the Invention

The present general inventive concept relates to an apparatus and a method of detecting an error in a data storage device, and more particularly, to an apparatus and a method of detecting an error symbol to improve an error correction performance of an error correcting decoder.

2. Description of the Related Art

Japanese Laid-open Patent No. 2000-243034 and Korean Laid-open Patent No. 1999-061966 relates to an equalizing process of a disk storage device.

In Japanese Laid-open Patent No. 2000-243034, an equalization processing technology, by which a symmetric finite impulse response (FIR) filter and an asymmetric FIR filter are connected to an output of a sampler in parallel, a phase of a phase locked loop (PLL) circuit is adjusted only using an output of the symmetric FIR filter, and an equalization is processed using the asymmetric FIR filter. In addition, Korean Laid-open Patent No. 1999-061966 discloses an equalization processing technology that is able to reduce error signals efficiently even when a signal obtained from a channel is asymmetric.

In general, hard disk drives that are data storage devices contribute to operate computer systems by reproducing data recorded in disks using a magnetic head or by recording data in the disk. The hard disk drives are being formed to have larger capacity, higher density and a small size. Accordingly, a bit per inch (BPI) that is a recording density in a rotary direction of the disk and a track per inch (TPI) that is a recording density in a diameter direction of the disk increase, and accordingly, a precise mechanism is required.

A data detecting device used in the hard disk drive currently is designed based on a partial response maximum likelihood (PRML) detection technology. The PRML detection device may increase a bit error rate (BER) due to media noises generated in recorded data patterns.

In order to compensate for the above problem, a post processor is added to the data detecting device to reduce the BER. However, the conventional post processor can detect the error only when an error of a maximum of 1 bit is generated at every codeword.

The conventional post-processing has at least two problems.

First, if the location of error generation is incorrectly determined and the supposed error is corrected, originally correct data is changed as if it is the error data, and thus, the BER increases.

Second, when the recording density of the hard disk drive increases, a signal to noise ratio (SNR) is reduced, and thus, two or more bits of errors may be generated per codeword. Therefore, the error cannot be corrected by the post processor.

SUMMARY OF THE INVENTION

The present general inventive concept provides an apparatus and a method of detecting a location where an error occurs in order to improve an error correcting property of an ECC decoder, and a disk drive using the apparatus and method.

The present general inventive concept also provides a computer readable recording medium having embodied thereon a computer program to execute the method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an error symbol detecting apparatus including an equalizer to equalize a signal transmitted to a channel using a channel equalization characteristic that is suitable for a corresponding system, a data detector to detect data from a signal output from the equalizer, a modeling tool having a same characteristic as a partial response (PR) target polynomial that is applied to the system with respect to the signal transmitted to the channel, a correlation evaluation information generating unit to generate correlation evaluation information based on a correlation degree between the signal output of the equalizer and a target output of the modeling tool, and an error symbol determination unit to determine an order of probability of error generation of one or more symbols based on the correlation evaluation information, and to determine a predetermined number of symbols having a high probability of generating one or more errors corresponding to the order of probability of error generation as one or more error generating symbols.

The correlation evaluation information generating unit may also include a matched filter to receive the data detected by the data detector, and to calculate correlation value of the input data corresponding to the PR target polynomial of the system, a second delay to delay the output of the equalizer in order to synchronize the data output from the matched filter with the data output from the equalizer, a first subtracter to calculate a difference between a signal output from the matched filter and a signal output from the second delay, a second subtracter to calculate a difference between the signal output from the matched filter and the target output from the modeling tool, and a multiply-accumulation calculator to generate correlation evaluation information by multiplying the output of the first subtracter with the output of the second subtracter and accumulating the multiplied values by symbol unit.

The error symbol determination unit may also include a serial-parallel transducer to output the correlation evaluation information of the symbol unit generated by the correlation evaluation information generating unit in a sector unit in parallel, a comparator to determine the order of the probability of error generation of the one or more symbols according to a magnitude of the correlation evaluation information output from the serial-parallel transducer, and an error symbol determiner to determine the predetermined number of symbols as the one or more error symbols according to the order of the probability of error generation of one or more symbols, and to output the determination result to an error correction decoder.

The foregoing and/or other aspects and utilities of the present general inventive concept may also be achieved by providing an error symbol detecting method including generating correlation evaluation information based on an output of an equalizer corresponding to a channel characteristic and a target output of a modeling tool having the same characteristics as a partial response PR target polynomial applied to the equalizer, determining an order of probability of error generation of one or more symbols according to the correlation evaluation information; and determining a predetermined number of symbols having a high probability of generating errors corresponding to the order of probability of error generation as one or more error symbols.

The generating of the correlation evaluation information may also include generating the output signal of the equalizer having a response characteristic corresponding to the PR target polynomial that is suitable for the corresponding channel characteristic, generating a correlation value corresponding to the PR target polynomial from the output signal of the equalizer, calculating a first subtracted value that corresponds to a difference between the output signal of the equalizer and the correlation value corresponding to the output signal, generating a target output signal using a modeling tool corresponding to the PR target polynomial, calculating a second subtracted value that corresponds to a difference between the target output signal of the modeling tool and the correlation value corresponding to the output signal, and generating correlation evaluation information that is obtained by multiplying the first subtracted value with the second subtracted value and accumulating the multiplied values by symbol units.

The foregoing and/or other aspects and utilities of the present general inventive concept may also be achieved by providing a computer readable recording medium having embodied thereon a computer program to execute a method, the method including generating correlation evaluation information based on an output of an equalizer corresponding to a channel characteristic and a target output of a modeling tool having a same characteristic as a partial response (PR) target polynomial applied to the equalize, determining an order of probability of error generation of one or more symbols according to the correlation evaluation information, and determining a predetermined number of symbols having a high probability of generating errors corresponding to the order of probability of error generation as one or more error symbols.

The foregoing and/or other aspects and utilities of the present general inventive concept may also be achieved by providing a disk drive including: a disk to store information, a transducer to read the information from the disk, an amplifier to change a gain of a signal detected by the transducer and to amplify the signal to a target level, an analog/digital transducer to convert the amplified signal to a digital signal, an equalizer to receive the digital signal that is converted by the analog/digital transducer and to equalize the digital signal to have a channel equalizing characteristic suitable for a corresponding system, a data detector to detect data from the signal output from the equalizer, a modeling tool corresponding to a partial response (PR) target polynomial that is applied to the system, a correlation evaluation information generating unit generating correlation evaluation information based on a correlation between the signal output of the equalizer and a target output of the modeling tool, and an error symbol determination unit determining an order of probability of error generation of one or more symbols based on the correlation evaluation information, and determining a predetermined number of symbols corresponding to the order of probability of error generation as one or more error symbols.

The foregoing and/or other aspects and utilities of the present general inventive concept may also be achieved by providing a computer readable recording medium having embodied thereon a computer program to detect error symbols based on correlation evaluation information based on an actual output of an equalizer corresponding to a channel characteristic and a target output of a modeling tool having a same characteristic corresponding to a PR target polynomial applied to the equalizer.

The foregoing and/or other aspects and utilities of the present general inventive concept may also be achieved by providing a method of detecting errors in a data storage device, the method generating a first signal corresponding to a partial response (PR) polynomial, generating a second signal corresponding to the PR polynomial, generating correlation evaluation information based on the first signal and the second signal, determining an order of probability of error generation of a plurality of symbols corresponding to the correlation evaluation information and determining at least one symbol having a high probability of generating errors corresponding to the order of probability of error generation of the plurality of symbols.

The foregoing and/or other aspects and utilities of the present general inventive concept may also be achieved by providing an error symbol detecting apparatus including an equalizer to generate a first signal corresponding to a partial response (PR) polynomial, a modeling tool to generate a second signal corresponding to the PR polynomial, a correlation evaluation information generating unit to generate correlation evaluation information corresponding to the first signal and the second signal, and an error symbol determination unit to determine an order of probability of error generation of a plurality of symbols corresponding to the correlation evaluation information, and to determine at least one symbol of the plurality of symbols having a high probability of generating errors corresponding to the order of probability of error generation of the plurality of symbols.

The foregoing and/or other aspects and utilities of the present general inventive concept may also be achieved by providing an error symbol detecting apparatus including a correlation evaluation information generating unit to generate correlation evaluation information of an input signal according to a correlation degree between a signal and a target signal, and an error symbol determination unit to determine one or more error symbols having a high probability of generating one or more errors in the signal according to the correlation evaluation information, the one or more symbols not having a parity-bit to be used to determine a position of the error symbols.

The foregoing and/or other aspects and utilities of the present general inventive concept may also be achieved by providing a disk drive apparatus including an error symbol detecting apparatus to generate correlation evaluation information of an input signal according to a correlation degree between a signal and a target signal, and to determine one or more error symbols having a high probability of generating one or more errors in the signal according to the correlation evaluation information, the one or more symbols not having a parity-bit to be used to determine a position of the error symbols and an ECC decoder to decode the signal according to one or more error symbols.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
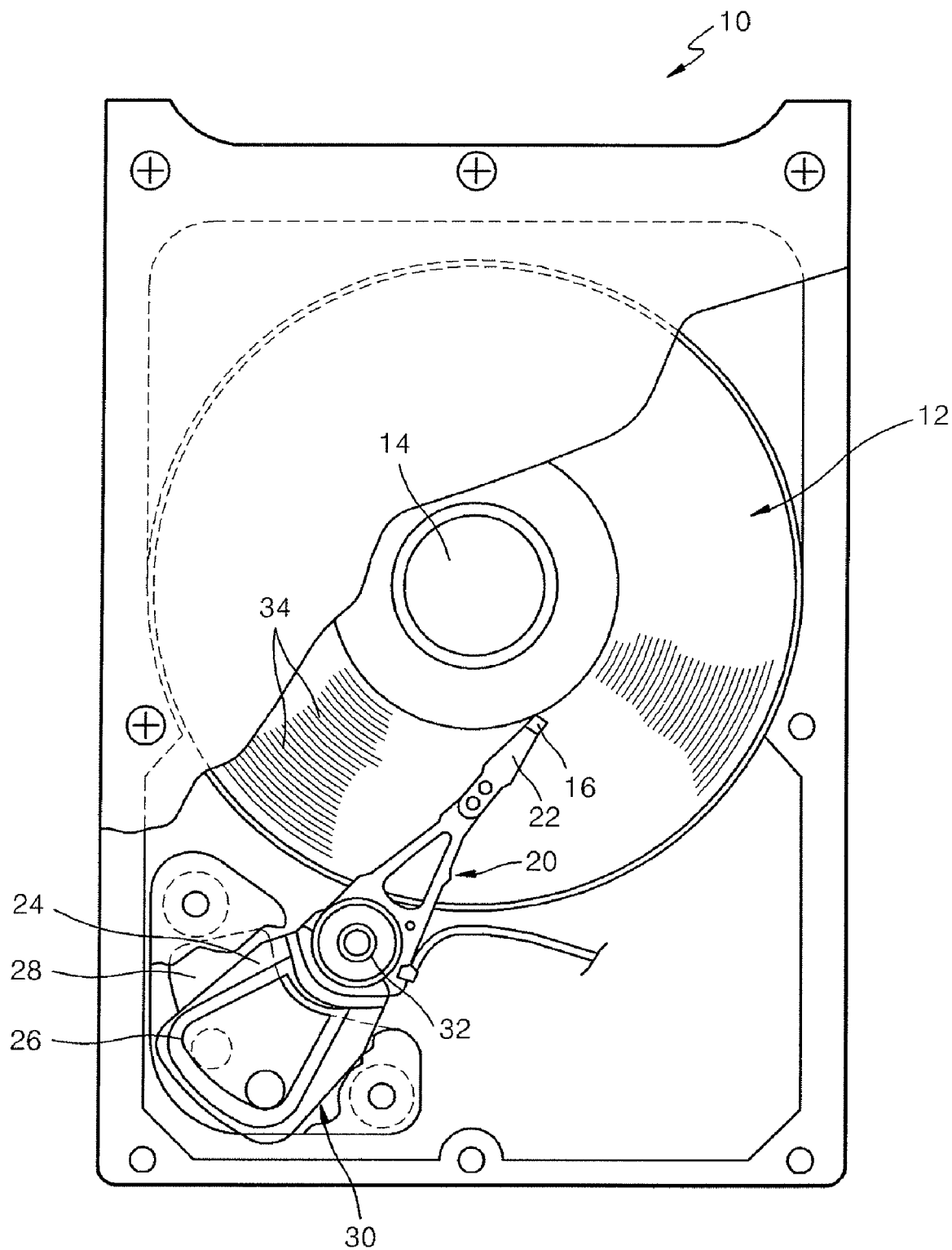
FIG. 1 is a plan view of a head disk assembly in a disk drive according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A data detection technology relating to the present general inventive concept will be described as follows.

In general, PRML technology is used to detect data in a hard disk drive. The PRML technology is essentially used in a case where a frequency bandwidth of reproduced data is limited such as a channel in the hard disk drive.

A partial response (PR) equalization method is used to change an entire response characteristic of a recording system (hard disk drive) including an equalizer to a target response characteristic after choosing a target response that is similar to a frequency characteristic of a recording channel.

That is, a PRML system sets a PR target polynomial G(D) that is similar to a channel response, and equalizes the signal of the corresponding channel to have the desired target characteristic using an equalizer.

The present general inventive concept can be applied, for example, in a case where the PR target polynomial G(D) can be resolved into at least two factors.

A hard disk drive as an example of a data storage device, to which an apparatus and a method of detecting an error of the present general inventive concept, includes a head disk assembly having mechanical elements and an electric circuit coupled to each other.

FIG. 1 is a plan view of a head disk assembly (HDA) 10 in a hard disk drive apparatus or system according to an embodiment of the present general inventive concept.

Referring to FIG. 1, the HDA 10 includes at least a magnetic disk 12 that is rotated by a spindle motor 14. The hard disk drive also includes a transducer 16 adjacent to a surface of the disk 12.

The transducer 16 detects an electric field of the disk 12 or magnetizes the disk 12 to read information from the rotating disk 12 or to write the information. The transducer 16 typically faces the surface of the disk 12. Although a single transducer 16 is illustrated in the drawings, it can be understood that the transducer 16 includes a writing transducer to magnetize the disk 12 and a reading transducer to detect the magnetic field of the disk 12 in an embodiment of the present general inventive concept. The reading transducer is formed of a magneto-resistive (MR) device. The transducer 16 is generally referred to as a head.

As illustrated in FIG.1, the transducer 16 can be integrated with a slider 20. The slider 20 generates an air bearing between the transducer 16 and the surface of the disk 12. In addition, the slider 20 is coupled to a head gimbals assembly 22. The head gimbals assembly 22 is attached to an actuator arm 24 having a voice coil 26. The voice coil 26 is adjacent to a magnetic assembly 28 that defines a voice coil motor (VCM) 30. A current supplied to the voice coil 26 generates a torque rotating the actuator arm 24 with respect to a bearing assembly 32. The rotation of the actuator arm 24 moves the transducer 16 across the surface of the disk 12.

Information is stored on annular tracks of the disk 12. Each of the tracks 34 generally includes a plurality of sectors. Each of the sectors includes a data field and an identification field. The identification field includes a gray code identifying the sectors and tracks (cylinder). The transducer 16 moves across the surface of the disk 12 in order to read the information or to write the information in other tracks.

The disk 12 can be classified as a user area and a non-user area. The user area is an area, to/from which the user can write/read data, and the non-user area is an area storing information relating to the disk drive.

Figure 2:
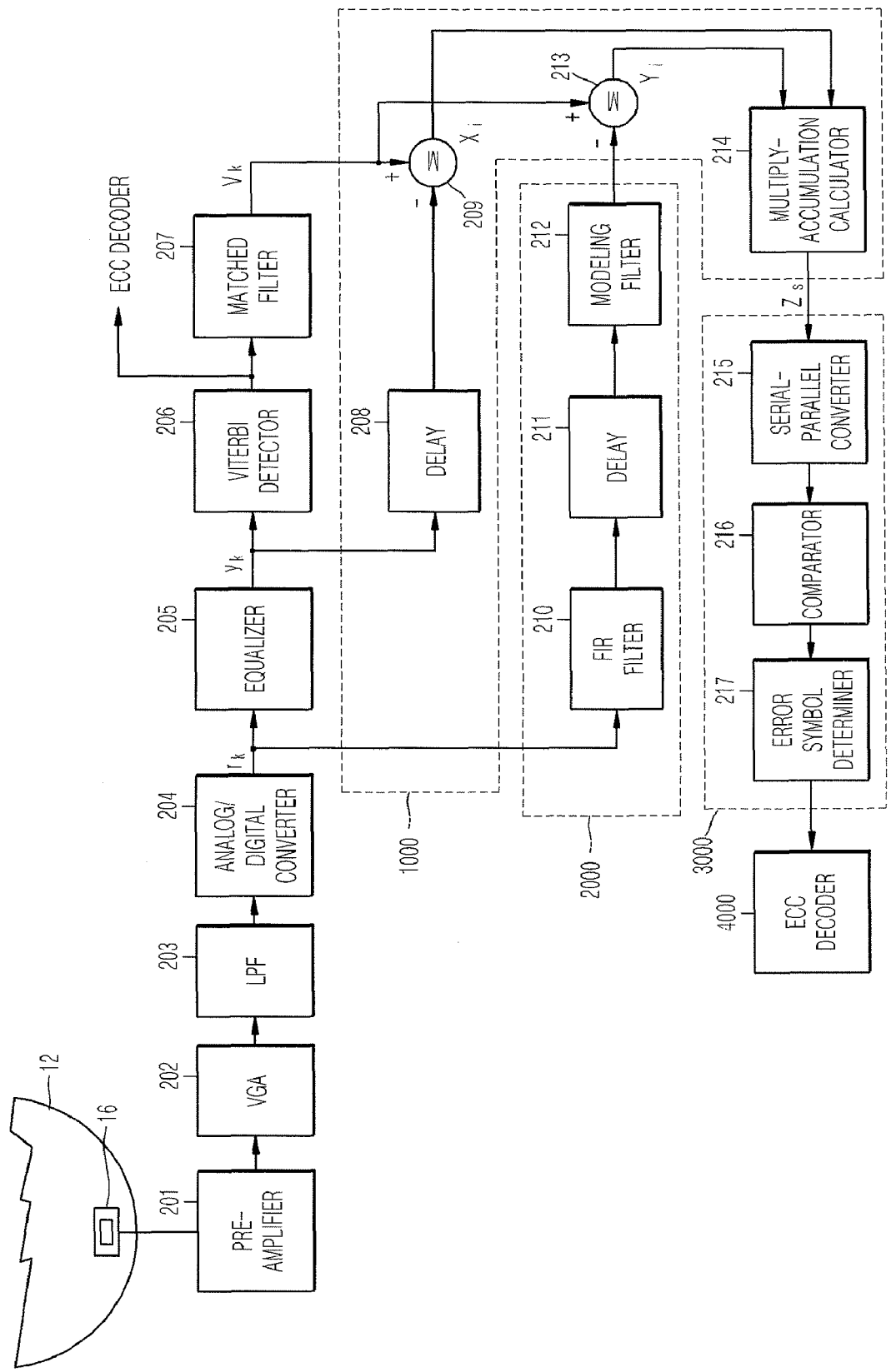
FIG. 2 is a block diagram of an electric circuit in the disk drive including an error symbol detecting apparatus according to an embodiment of the present general inventive concept.

FIG. 2 is a view illustrating an electric system configuration to detect error symbols in a disk drive apparatus according to an embodiment of the present general inventive concept.

Referring to FIGS. 1 and 2, the electric system to detect the error symbol according to an embodiment of the present general inventive concept includes a pre-amplifier 201, a variable gain amplifier (VGA) 202, a low pass filter (LPF) 203, an analog/digital transducer such as an analog/digital converter 204, an equalizer 205, a Viterbi detector 206, a matched filter 207, delays 208 and 211, subtracters 209 and 213, an FIR filter 210, a modeling filter 212, a multiply-accumulation calculator 214, a serial-parallel transducer such as a serial-parallel converter 215, a comparator 216, and an error symbol determiner 217. The electric system of FIG. 2 can be implemented in the hard disk drive apparatus or an external device connected to the HDS of FIG. 1 or the hard disk drive.

Referring to FIG. 2, a component including the delay 208, the subtracters 209 and 214, and the multiply-accumulate calculator 214 is referred to as a correlation evaluation information generating unit 1000, a component including the FIR filter 210, the delay 211, and the modeling filter 212 is referred to as a modeling tool 2000, and a component including the serial-parallel transducer 215, the comparator 216, and the error symbol determiner 217 is referred to as an error symbol determination unit 3000.

The pre-amplifier 201 amplifies an electric signal detected by the transducer 16 from the disk 12 using a fixed gain value.

In an embodiment of the present general inventive concept, the VGA 202 changes the gain to amplify the signal that is primarily amplified in the pre-amplifier 201 to amplify the signal to an optimal status. That is, the VGA 202 reduces the gain when the magnitude of the signal is larger and increases the gain when the magnitude of the signal is small while monitoring the output of the analog/digital transducer 204.

The LPF 203 passes components of a low frequency band in the output signal of the VGA 202 in order to remove noise components included in the output signal.

The analog/digital transducer 204 converts an analog output signal of the LPF 203 into a digital signal rk.

The digital signal rk converted by the analog/digital transducer 204 is output to the equalizer 205.

The equalizer 205 receives the digital signal rk converted by the analog/digital transducer 204 as an input signal and equalizes the input signal to have a channel equalization characteristic suitable for a corresponding system. The corresponding system may be the electric system of FIG. 2 used in the hard disk drive apparatus or a decoder to decode the signal reproduced from a disk.

The equalizer 205 according to the present general inventive concept uses a PR equalization method in order to compensate for interference between symbols in a high density recording system.

In an embodiment of the present general inventive concept, a PR target polynomial G(D) is as identified below in Equation 1.

$$G(D)=(1-D)(c_0+c_1D+c_2D^2+c_3D^3) \quad (1)$$

Accordingly, the equalizer 205 can be designed as an FIR filter to have a channel equalization characteristic corresponding to the expression G(D) in an embodiment of the present general inventive concept.

The Viterbi detector 206 detects data by generating Viterbi trellis and finding a path having the lowest accumulation error.

The matched filter 207 receives the data detected by the Viterbi detector 206, and calculates a correlation value ($V_k$) of the input data according to a PR target of the system and outputs the calculated value.

In an embodiment of the present general inventive concept, the modeling tool 2000 can be designed as follows.

The FIR filter 210, for example, is designed to realize (1-D) that corresponds to a natural characteristic among the factors obtained by resolving the PR target polynomial G(D) such as in Equation 1.

In addition, the modeling filter 212 can be designed to have the same response characteristic as that of $(c_0+c_1D+c_2D^2+c_3D^3)$ that is a remaining factor obtained by resolving the PR target polynomial G(D).

The delay 211 delays the output in order to synchronize the output with the data passing through the matched filter 207. For example, the delay 211 stores the data in a buffer and outputs the data from the buffer after a predetermined time elapses. Alternatively, the location of the delay 211 can be moved to a front of the FIR filter 210 or to a back of the modeling filter 212.

Accordingly, the modeling tool 2000 is designed to have the same characteristics as those of the PR target polynomial G(D).

In an embodiment of the present general inventive concept, the correlation evaluation information generating unit 1000 can operate as follows.

The delay 208 delays an output signal $y_k$ of the equalizer 205 in order to synchronize the output signal with the data passing through the matched filter 207.

The subtracter 209 calculates a difference $X_i$ between the correlation data $V_k$ output from the matched filter 207 and the output signal $Y_k$ delayed from the equalizer 205. Accordingly, the subtracter 213 calculates a difference $Y_i$ between the correlation data $V_k$ output from the matched filter 207 and an output signal of the modeling tool 2000.

Accordingly, the multiply-accumulation calculator 214 multiplies output values of the subtractors 209 and 213, and accumulates the results by a symbol unit. That is, an output $Z_s$ of the multiply-accumulation calculator 214 can be represented by following Equation 2.

$$Z_s = \Sigma X_i Y_i \quad (2)$$

Therefore, the output $Z_s$ of the multiplay-accumulation calculator 214 corresponds to correlation evaluation information with respect to the actual output of the equalizer 205 and the target output of the modeling tool 2000.

The correlation evaluation information $Z_s$ has a large value in an error-dominant pattern. In addition, $Z_s$ is calculated sequentially in one sector by the symbol unit.

In an embodiment of the present general inventive concept, the error symbol determination unit 3000 operates as follows.

The serial-parallel transducer 215 outputs a plurality of $Z_s$ that are calculated by sectors in the correlation evaluation information generating unit 1000 to the comparator 216 in parallel.

The comparator 216 compares the values of $Z_s$ with respect to the symbols in one sector area to determine an order. In an embodiment of the present general inventive concept, the larger the value of $Z_s$, the higher the probability is of generating the error.

Accordingly, the error symbol determiner 217 determines a predetermined number of symbols having the high probability of generating the error as error symbols based on the order determined by the comparator 216, and outputs the result to an error correction code (ECC) decoder. That is, the error symbol determiner 217 determines the predetermined number of symbols as the error symbols in an order based on the respective size or value of the $Z_s$ in one sector area. In an embodiment of the present general inventive concept, the predetermined number can be set through an experiment in consideration of the characteristics of the recording channel. The ECC decoder 4000 receives signals from the error symbol determination unit 3000 and the Viterbi detector 206 to decode the data of the Viterbi detector 206 according to the output of the error symbol determination unit 3000.

Figure 3:
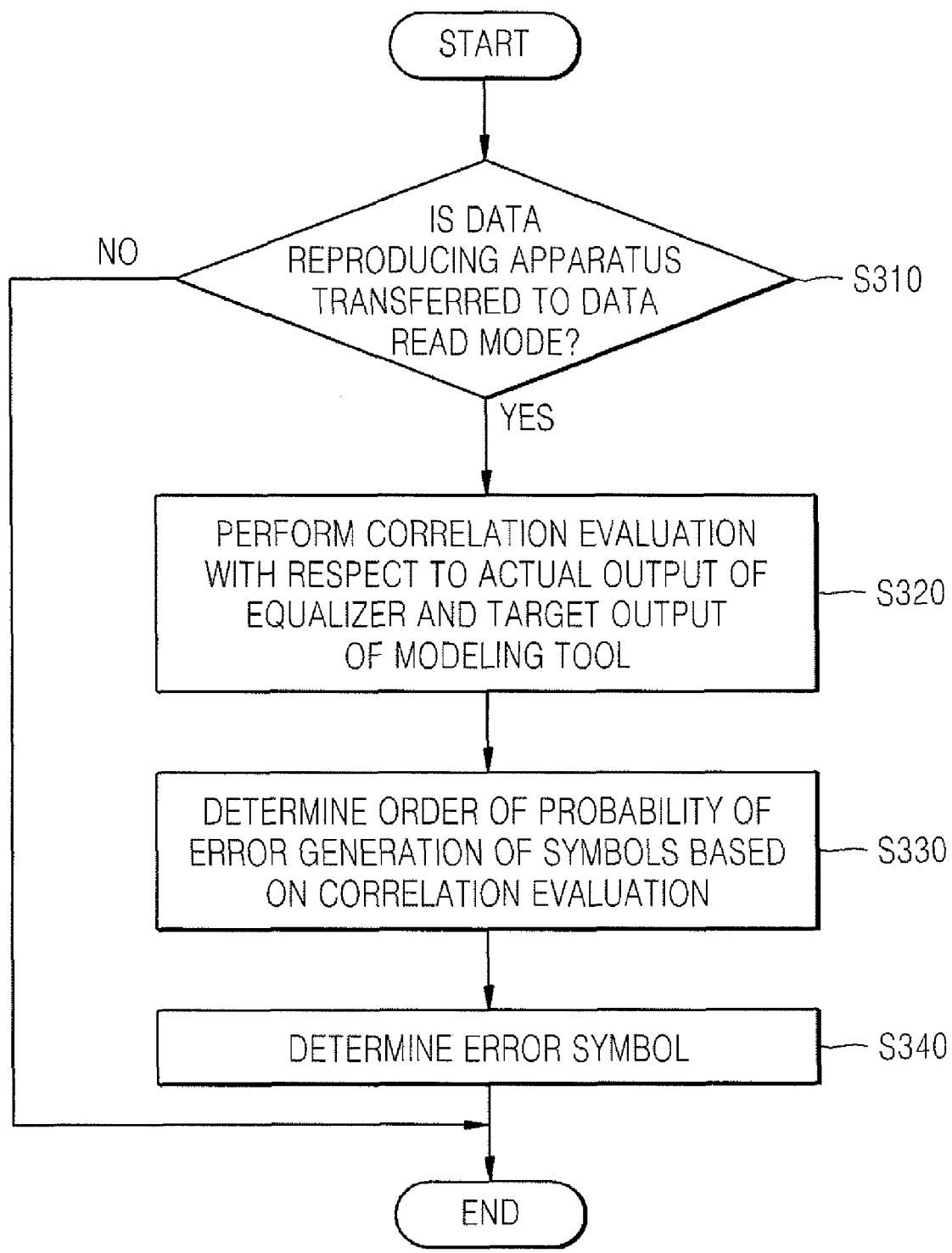
FIG. 3 is a flow chart illustrating a method of detecting an error symbol according to an embodiment of the present general inventive concept.

FIG. 3 is a flow chart illustrating a method of detecting an error according to an embodiment of the present general inventive concept.

Referring to FIGS. 2 and 3, in operation 310, it is determined whether the data reproducing apparatus is transferred to a data read mode.

As a result of the determination in operation S310, if the data reproducing apparatus is transferred to the data read mode, a process to generate the correlation evaluation information between an actual output of the equalizer that reflects the characteristics of the corresponding channel and a target output of the modeling tool designed to have the same characteristics as those of the PR target polynomial using the signal read from the recording medium is performed in operation S320.

The process of S320 is performed as follows.

First, an actual output signal of the equalizer having the response characteristic corresponding to the PR target polynomial suitable for the characteristics of the channel is generated. In addition, the correlation value corresponding to the PR target of the system is generated from the actual output signal of the equalizer.

Accordingly, a first subtracted value $X_i$ that is a difference between the actual output signal and the correlation value corresponding to the output signal is calculated.

A target output signal is generated using the modeling tool that is designed to correspond to the PR target polynomial, and a second subtracted value $Y_i$ that is a difference between the target output signal of the modeling tool and the correlation value corresponding to the output signal is calculated.

The first subtracted value is multiplied with the second subtracted value, and then, the multiplied values are accumulated by the symbol unit to generate the correlation evaluation information $Z_s$.

After generating the correlation evaluation information $Z_s$ in one sector area, an order of probability of error generation of the symbols is determined based on the correlation evaluation information $Z_s$ in operation S330. That is, values of the correlation evaluation information $Z_s$ are compared with each other, and then, if the value of the correlation evaluation information $Z_s$ is large, it can be determined that the probability of generating an error is high.

In addition, in operation S340, the predetermined number of symbols is determined as error symbols in an order of sizes of the $Z_s$ in one sector area.

According to the above method, in an embodiment of the present general inventive concept, the symbols, in which errors occur, can be detected, and the error symbol information is output to the ECC decoder to perform the error correction in the symbol unit.

The error correction in the ECC decoder may be performed using reed Solomon (RS) codes.

The RS code can correct multiple random errors, and represent the one symbol as multi-bits. The base unit of the correction in the RS code is defined as the symbol.

An RS encoder is a block generating a parity-check, and generates a parity-check of 2 k bytes with respect to a message of k bytes. The generated parity-check is added to the message of k bytes. The message of k bytes becomes a polynomial having (k-1) degrees, and the parity-check is a polynomial corresponding to a remainder when the polynomial having k degrees is divided by a generator polynomial defined by the RS code.

An RS decoder calculates 2t syndromes. Each of the syndromes is a remainder of a calculation that divides the received polynomial using a root of the generator polynomial. If all of the 2t syndromes have the value of zero, the error does not occur, and if not all of the 2t syndromes have the value of zero, the error occurs.

If the error occurs, an error position polynomial and an error evaluation polynomial are calculated using the 2t syndromes. In this case, the maximum number of symbols, the errors of which can be corrected, is t.

However, if the position where the error occurs can be identified exactly, the error evaluation polynomial to obtain the error pattern using the 2t syndromes can be generated, and thus, the number of symbols, the errors of which can be corrected, increases to 2t.

According to the present general inventive concept, the maximum number of symbols, the errors of which can be corrected, is increased using the principles of the RS code.

That is, the symbols having a high probability of generating errors are detected in a status where a parity-bit is not inserted and then determined as the positions of error symbols, and the error evaluation polynomial is generated using the 2t syndromes, and thereby increasing the number of symbols that can be corrected to the number of 2t.

As described above, according to the present general inventive concept, the symbols, in which errors occur, can be detected without inserting the parity-bit using the post processor, and thus, the error correction performance of the error correction decoder can be improved. That is, the number of symbols that can be corrected is increased, and even when the error of 2 bits or more occurs per a codeword, the error can be detected and corrected using the ECC decoder.

The present general inventive concept can be implemented as a method, an apparatus, and a system. When the present general inventive concept is implemented in software, its component elements are code segments that execute necessary operations. Programs, codes and code segments to accomplish the present general inventive concept can be easily construed by programmers skilled in the art to which the present general inventive concept pertains, and can be stored in processor readable media. The processor readable medium can be any medium that can store or transmit data. Examples of the processor readable medium include electronic circuits, semiconductor memory devices, random-access memory (RAM), ROMs, flash memories, erasable ROMs (EROMs), magnetic tapes, floppy disks, optical disks, hard disk, etc.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An error symbol detecting apparatus comprising:
   an equalizer to equalize a signal transmitted to a channel using a channel equalization characteristic that is suitable for a corresponding system;
   a data detector to detect data from a signal output from the equalizer;
   a modeling tool having a same characteristic as a partial response (PR) target polynomial applied to the system with respect to the signal transmitted to the channel;
   a correlation evaluation information generating unit to generate correlation evaluation information based on a correlation degree between the signal output of the equalizer and a target output of the modeling tool; and
   an error symbol determination unit to determine an order of probability of error generation of one or more symbols based on the correlation evaluation information, and to determine a predetermined number of symbols having a high probability of generating one or more errors corresponding to the order of probability of error generation as one or more error generating symbols, the error symbol determination unit having:
      a serial-parallel transducer to output the correlation evaluation information of the symbol unit generated by the correlation evaluation information generating unit in a sector unit in parallel;
      a comparator to determine the order of the probability of error generation of the one or more symbols according to a magnitude of the correlation evaluation information output from the serial-parallel transducer; and
      an error symbol determiner to determine the predetermined number of symbols as the one or more error symbols according to the order of the probability of error generation of the one or more symbols, and to output the determination result to an error correction decoder;
   wherein the equalizer comprises a FIR filter.

2. The apparatus of claim 1, wherein the modeling tool comprises:
   a finite impulse response (FIR) filter having a response characteristic corresponding to a factor obtained by resolving the PR target polynomial according to the signal;
   a modeling filter connected to the FIR filter in series, and corresponding to remaining factors obtained by resolving the PR target polynomial except for the factor realized by the FIR filter; and
   a first delay to delay an output of the modeling filter in order to synchronize the data output from the equalizer to be used in a correlation evaluation with data output from the modeling filter.

3. The apparatus of claim 1, wherein the data detector comprises a Viterbi detector.

4. The apparatus of claim 1, wherein the correlation evaluation information generating unit comprises:
   a matched filter to receive the data detected by the data detector, and to calculate a correlation value of the input data corresponding to the PR target polynomial of the system;

a second delay to delay the output of the equalizer in order to synchronize the data output from the matched filter with the data output from the equalizer;

a first subtracter to calculate a difference between a signal output from the matched filter and a signal output from the second delay;

a second subtracter to calculate a difference between the signal output from the matched filter and the target output from the modeling tool; and a multiply-accumulation calculator to generate correlation evaluation information by multiplying the output of the first subtracter with the output of the second subtracter and accumulating the multiplied values by a symbol unit.

5. The apparatus of claim 4, wherein a magnitude of the correlation evaluation information represents a determination that the error is likely to occur.

6. An error symbol detecting method comprising:

generating correlation evaluation information based on an output of an equalizer corresponding to a channel characteristic and a target output of a modeling tool having a same characteristic as a partial response (PR) target polynomial applied to the equalizer by generating a correlation value correspondinq to the PR target polynomial from the output signal of the equalizer;

determining an order of probability of error generation of one or more symbols with a sector unit according to a magnitude of the correlation evaluation information; and determining a predetermined number of symbols having a high probability of generating errors corresponding to the order of probability of error generation as one or more error symbols;

wherein the equalizer comprises an FIR filter.

7. The method of claim 6, wherein the generating of the correlation evaluation information comprises:

generating the output signal of the equalizer having a response characteristic corresponding to the PR target polynomial that is suitable for the corresponding channel characteristic;

calculating a first subtracted value that corresponds to a difference between the output signal of the equalizer and the correlation value corresponding to the output signal;

generating a target output signal using a modeling tool corresponding to the PR target polynomial;

calculating a second subtracted value that corresponds to a difference between the target output signal of the modeling tool and the correlation value corresponding to the output signal; and generating correlation evaluation information that is obtained by multiplying the first subtracted value with the second subtracted value and accumulating the multiplied values by symbol units.

8. A computer readable recording medium having embodied thereon a computer program to execute a method, the method comprising:

generating correlation evaluation information based on an output of an equalizer corresponding to a channel characteristic and a target output of a modeling tool having a same characteristic as a partial response (PR) target polynomial applied to the equalizer by generating a correlation value corresponding to the PR target polynomial from the output signal of the equalizer;

determining an order of probability of error generation of one or more symbols with a sector unit according to a magnitude of the correlation evaluation information; and determining a predetermined number of symbols having a high probability of generating errors corresponding to the order of probability of error generation as one or more error symbols;

wherein the equalizer comprises a FIR filter.

9. A disk drive comprising:

a disk to store information;

a transducer to read the information from the disk;

an amplifier to change a gain of a signal detected by the transducer and to amplify the signal to a target level;

an analog/digital transducer to convert the amplified signal to a digital signal;

an equalizer to receive the digital signal that is converted by the analog/digital transducer and to equalize the digital signal to have a channel equalizing characteristic suitable for a corresponding system;

a data detector to detect data from the signal output from the equalizer;

a modeling tool corresponding to a partial response (PR) target polynomial that is applied to the system;

a correlation evaluation information generating unit to generate correlation evaluation information based on a correlation between the signal output of the equalizer and a target output of the modeling tool; and an error symbol determination unit to determine an order of probability of error generation of one or more symbols based on the correlation evaluation information, and to determine a predetermined number of symbols corresponding to the order of probability of error generation as one or more error symbols the error symbol determination unit having:

a serial-parallel transducer to output the correlation evaluation information of the symbol unit generated by the correlation evaluation information generating unit in a sector unit in parallel;

a comparator to determine an order of the probability of error generation of the one or more symbols according to a magnitude of the correlation evaluation information output from the serial-parallel transducer; and an error symbol determiner to determine the predetermined number of symbols as the one or more error symbols according to the order of the probability of error generation of the one or more symbols, and to output the determination result to an error correction decoder.

10. The disk drive of claim 9, wherein the correlation evaluation information generating unit comprises:

a matched filter to receive the data detected by the data detector, and to calculate correlation value of the input data corresponding to the PR target polynomial of the system;

a first delay to delay the output of the equalizer in order to synchronize data output from the matched filter with the data output from the equalizer;

a first subtracter to calculate a difference between a signal output from the matched filter and a signal output from the first delay;

a second subtracter to calculate a difference between the signal output from the matched filter and the target output from the modeling tool; and a multiply-accumulation calculator to generate the correlation evaluation information by multiplying output of the first subtracter with output of the second subtracter and accumulating the multiplied values by a symbol unit.

11. The disk drive of claim 9, wherein the modeling tool comprises:

an FIR filter having a response characteristic corresponding to a factor obtained by resolving a PR target polynomial;

a modeling filter connected to the FIR filter in series, and designed to correspond to remaining factors obtained by resolving the PR target polynomial except for the factor realized by the FIR filter; and a second delay to delay an output of the modeling filter to synchronize the data output from the equalizer to be used in a correlation evaluation with the target output from the modeling filter.

12. The disk drive of claim 9, wherein the data detector comprises a Viterbi detector.

13. The disk drive of claim 9, wherein the equalizer comprises an FIR filter.

14. A method of detecting errors in a data storage device, the method comprising:

generating a first signal corresponding to a partial response (PR) polynomial;

generating a second signal corresponding to the PR polynomial;

generating correlation evaluation information based on the first signal and the second signal;

determining an order of probability of error generation of one or more symbols corresponding to the correlation evaluation information; and determining at least one symbol having a high probability of generating errors corresponding to the order of probability of error generation of one or more symbols;

wherein the PR polynomial corresponds to a channel characteristic of the data storage device, wherein the determining the order of the probability of error generation further comprises ranking the one or more symbols with respect to each other based on a value associated with each of the one or more symbols in a manner that a symbol associated with a greater value can be ranked higher than an other symbol associated with a lesser value.

15. The method of claim 14, wherein the first signal is a signal output from an equalizer.

16. The method of claim 14, wherein the second signal is a target output of a modeling tool.

17. The method of claim 14, wherein the determining the at least one symbol of the one or more symbols further comprises selecting a predetermined number of the highest ranked symbols.

18. The method of claim 14, wherein the determining the at least one symbol of the plurality of symbols further comprises selecting at least one symbol based on the value of the at least one symbol being equal to or greater than a predetermined value.

* * * * *